Aug. 21, 1956　　J. B. MacNEILL ET AL　　2,760,033
CIRCUIT INTERRUPTER

Filed Nov. 19, 1952　　5 Sheets-Sheet 1

Closed

Trip Free

Open

WITNESSES:
E. A. McCloskey
W. R. Crout

INVENTORS
John B. MacNeill, Fritz E. Florschutz
and Carl G. Lentjes.
BY Ralph D. Swingle
ATTORNEY

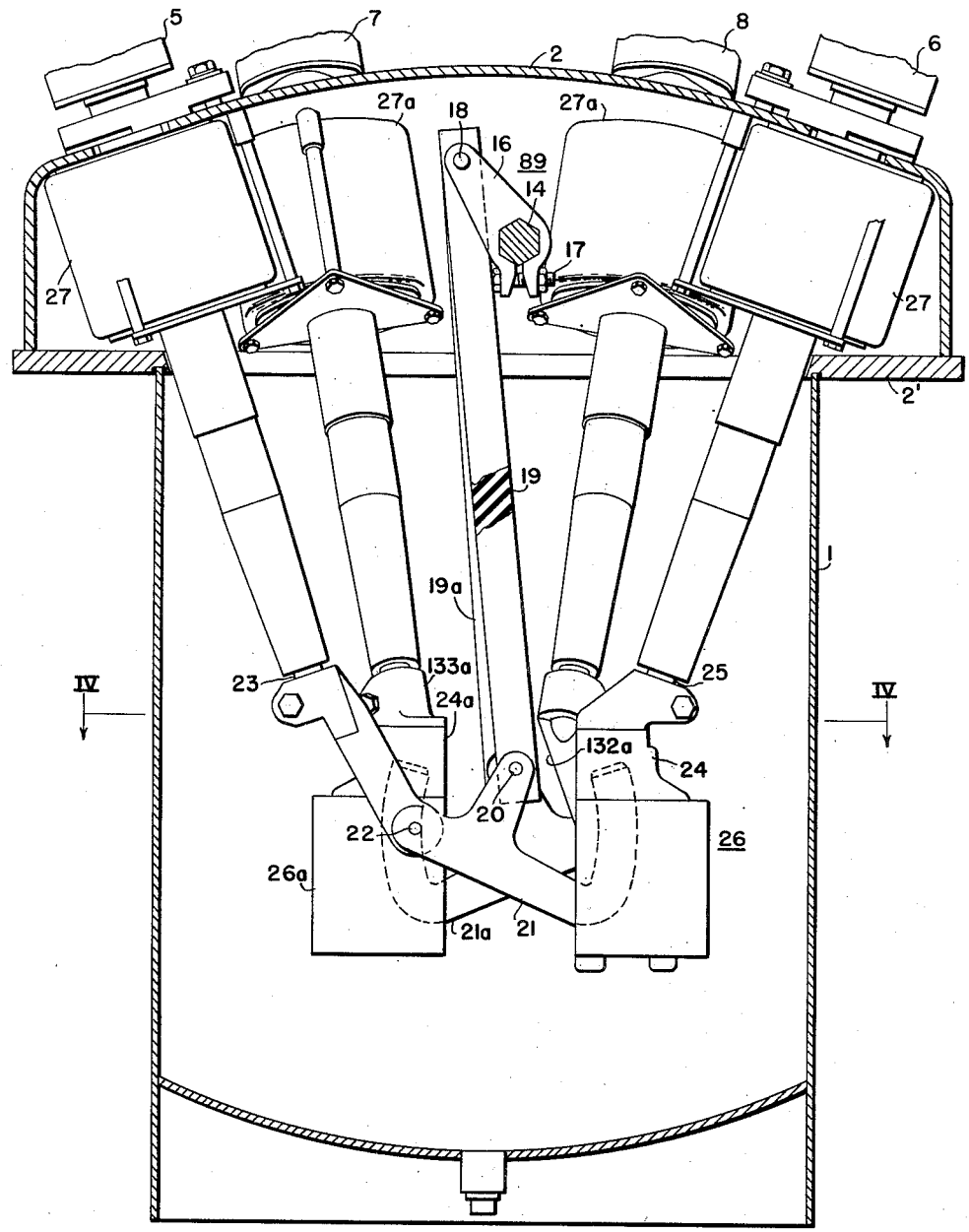

Aug. 21, 1956    J. B. MacNEILL ET AL    2,760,033
CIRCUIT INTERRUPTER

Filed Nov. 19, 1952    5 Sheets-Sheet 3

WITNESSES:
E. A. McCloskey
W. R. Crout

INVENTORS
John B. MacNeill, Fritz E. Florschutz
and Carl G. Lentjes.
BY
Ralph H. Swingle
ATTORNEY

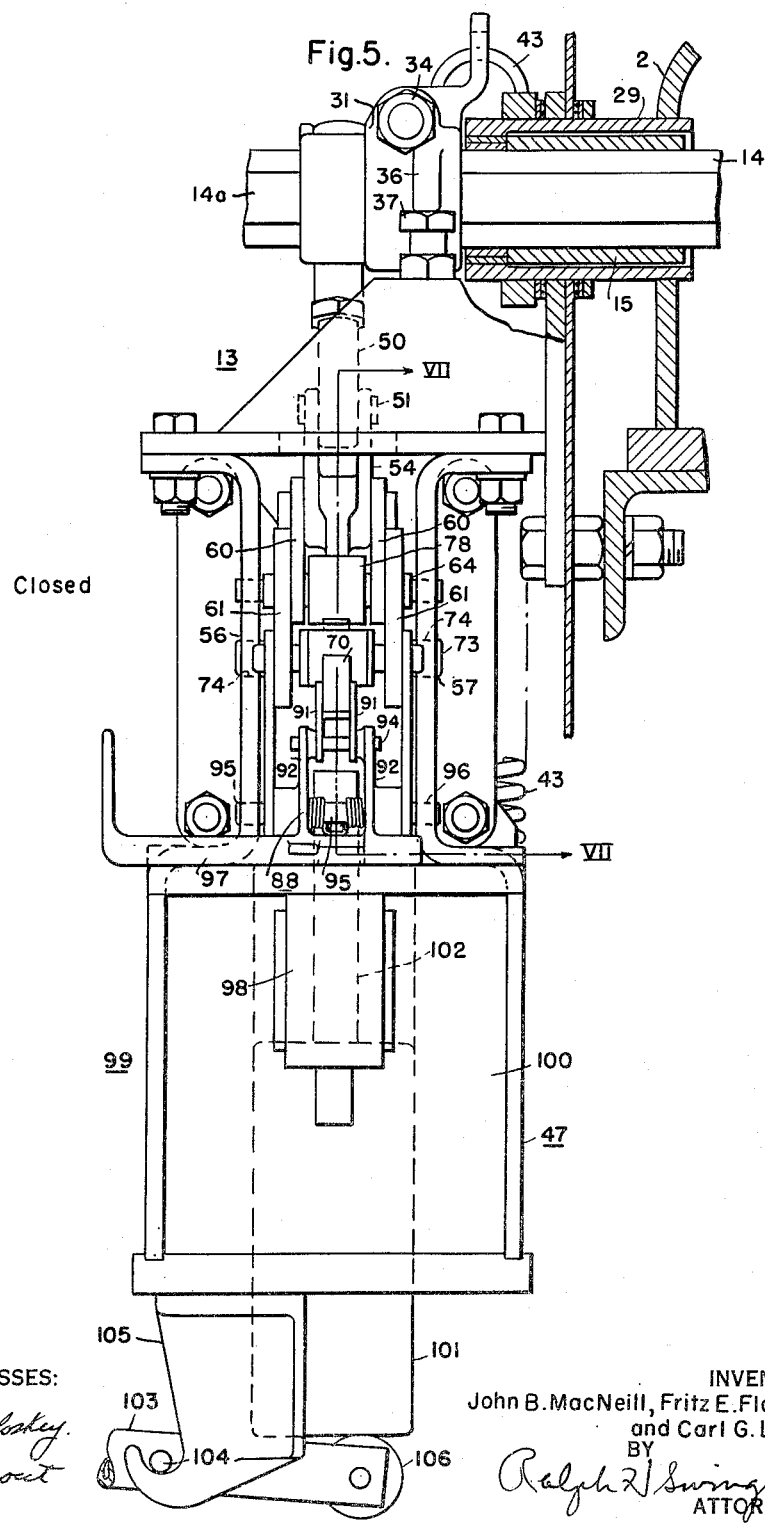

INVENTORS
John B. MacNeill, Fritz E. Florschutz
and Carl G. Lentjes

United States Patent Office 2,760,033
Patented Aug. 21, 1956

2,760,033

CIRCUIT INTERRUPTER

John B. MacNeill, Wilkinsburg, and Fritz E. Florschutz and Carl G. Lentjes, Pittsburgh, Pa., assignors to Westinghouse Electric Corporation, East Pittsburgh, Pa., a corporation of Pennsylvania Application November 19, 1952, Serial No. 321,362

11 Claims. (Cl. 200—150)

This invention relates generally to circuit interrupters, and, more particularly, to arc-extinguishing structures and operating mechanisms therefor.

A general object of our invention is to provide an improved circuit interrupter of more compact form and more effective in operation than any that has been provided heretofore.

We provide such a compact construction by enclosing the extinguishing units for the three phases of multiphase transmission line within a single tank enclosure and by a novel linkage arrangement providing highly effective and extremely rapid opening and closing operations.

Another object is to provide an improved arrangement for the arc-extinguishing structures within a tank for a multiphase breaker having adequate clearances and yet to have the resulting structure highly compact.

Another object is to actuate the movable contacts of one or more such extinguishing structures by an improved operating mechanism which will eliminate the necessity for the use of cumbersome straight-line motion linkage and which will be highly effective in operation.

Yet another object is to provide an improved high-speed operating mechanism for a circuit interrupter which will utilize few parts of simple construction and will provide highly effective operation.

Further objects and advantages will readily become apparent upon reading the following specification, taken in conjunction with the drawings, in which:

Fig. 3 is an enlarged vertical sectional view through the enclosing tank of the circuit interrupter of our invention, illustrating the position of the arc-extinguishing units, the contact structure being shown in the closed-circuit position;

Fig. 5 is an enlarged side elevational view of the operating mechanism of Fig. 1, the contact structure being in the closed-circuit position;

Figure 2:
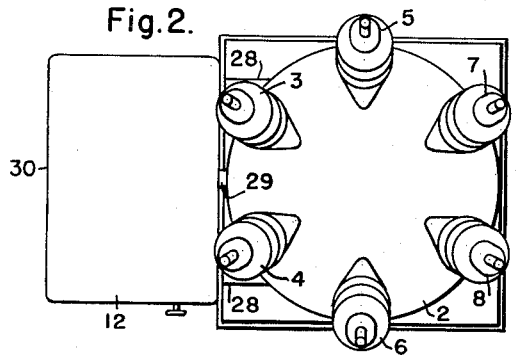
Fig. 2 is a top plan view of the three-phase circuit interrupter shown in Fig. 1.
Figure 1:
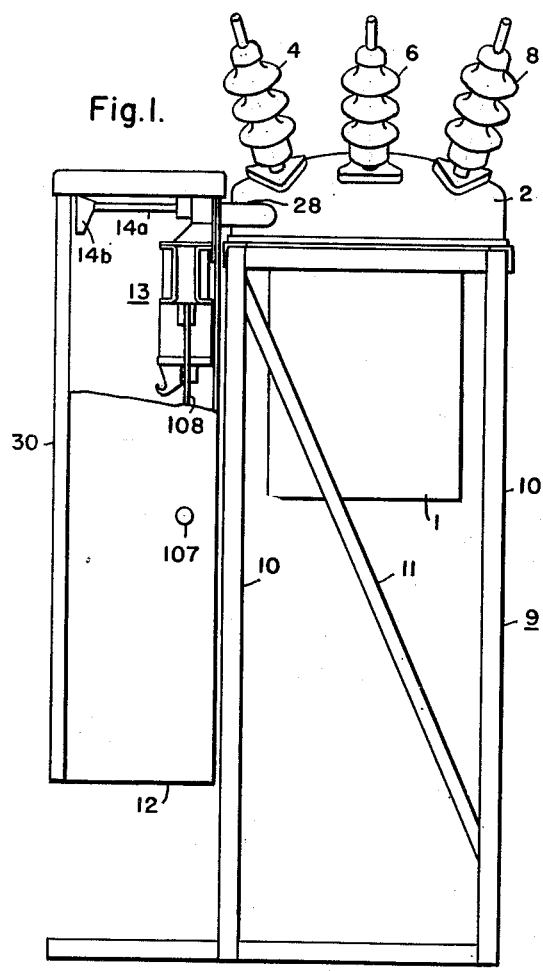
Figure 1 is a side elevational view, partially in section, of a circuit interrupter embodying the principles of our invention, and shown in the closed-circuit position.

Referring to the drawings, and more particularly to Figs. 1 and 2 thereof, the reference character 1 designates a tank filled with oil, through the cover 2 of which extends three pairs of terminal bushings 3–8. The tank 1 is supported by a structural steel framework 9 composed of angle members, some of which 10 are disposed vertically and others of which 11 are disposed angularly.

The cover 2 is domed and the six bushings 3–8 are arranged in a circle, with each bushing normal to the domed portion of the cover where it passes therethrough. This gives the desirable result that the bushings are inclined inwardly at their lower ends and outwardly at their upper ends without the use of special adaptors for mounting the bushings at the points where they pass through the cover. The outward inclination of the outer ends of the bushings gives a maximum flashover distance through air between the terminals which are connected to different phase conductors of a three-phase circuit, as shown in Fig. 2. At the same time, the inward inclination of the inner ends of the bushings makes possible the use of a small tank 1 and a smaller volume of oil since the dielectric strength of the oil about the inner ends of the bushings gives adequate flashover distance in spite of the close spacing.

At the lower edge of the domed cover 2 there is an inwardly extending annular flange 2' against the inner edge of which the top edge of the tank 1 is held. This makes possible ample spacing of the six bushings around the cover and gives a generous amount of space within the cover for six current transformers 27, hereinafter described, but at the same time makes possible the use of a small tank 1 having only a small volume of oil. It is to be noted that the diameter of the tank 1 is no greater than the diameter of the circle at which the bushings pass through the dome of the cover, and that the current transformers occupy a space having a diameter greater than the diameter of the tank 1.

Bolted to one side of the structure steel framework 9 is a mechanism housing 12, within which are disposed the mechanism proper 13 and a panelboard, not shown, on which are disposed various relays and contactors, which specifically form no part of our invention.

Figure 4:
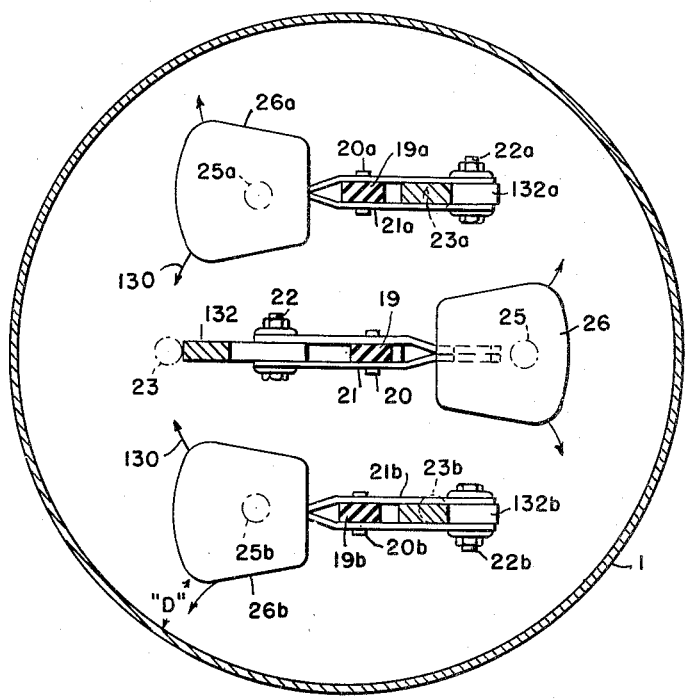
Fig. 4 is a sectional view taken along the line IV–IV of Fig. 3 looking in the direction of the arrows.
Figure 10:
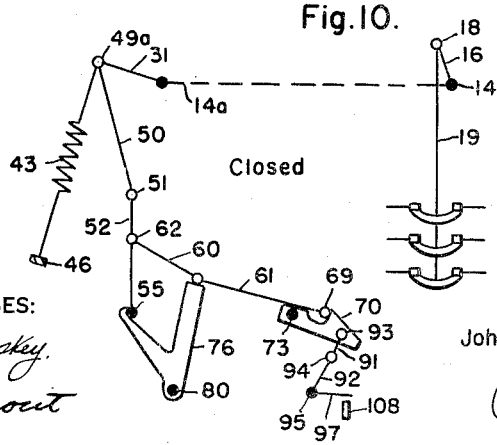

Referring particularly to Figs. 3 and 4, which show the internal construction of the tank 1 more clearly, it will be observed that a hexagonal operating shaft 14 extends through the side of the cover 2 of the tank 1, being supported by suitable bearings disposed in the cover 2, one such bearing being indicated at 15 in Fig. 5. An actuating crank 16 is clamped by a bolt 17 to the operating shaft 14 so as to rotate therewith. Pivotally connected, as at 18, to the upper end of the actuating crank 16, as viewed in Fig. 3 is an insulating operating rod 19, the lower end of which is pivotally connected, as at 20, to a hook-shaped movable contact 21. The hook-shaped movable contact 21 is pivotally mounted on a stationary pivot 22 supported at the lower end of a terminal stud 23, the latter extending internally through the terminal bushing 5.

The hook-shaped movable contact 21 cooperates with stationary contact structure 24 supported at the lower end of the opposite terminal stud 25, the latter extending internally through a second terminal bushing 6. Associated with the stationary contact structure 24, which may be of a segmental finger-type construction, is an arc-extinguishing unit, generally designated by the reference character 26. The particular construction of the arc-extinguishing unit 26 forms no part of our invention and it may assume different forms. A preferable construction of the arc-extinguishing unit 26 is that set out in U. S. Patent 2,039,054 issued April 28, 1936, to Samuel H. Boden and Stanley T. Schofield, and assigned to the assignee of the instant application.

Referring to Fig. 4, it will be observed that a single arc-extinguishing unit 26 is provided for each of the three poles of the interrupter, each pole including a pair of the terminal bushings 3, 4 or 5, 6 or 7, 8. The use of a single arc-extinguisher for each pole, instead of two per pole as generally used in the past, not only saves the cost of three arc extinguishers in the three-pole breaker, but also reduces the space required, makes possible the use of a smaller tank and less oil, and gives a shorter total length of arc with less arc energy to decompose oil and cause gas pressure in the tank.

Fig. 4 also illustrates how the three arc-extinguishing units 26 are staggered or positioned in a triangle, to be as compact as possible and provide adequate clearance "D" between the units 26 and the inner wall of the tank 1. The clearance "D" is so adequate that no tank liner need be provided, as has been customary. Fig. 4 shows the compact arrangement of the units 26.

Although the center pole construction was described heretofore in connection with Fig. 3, the outside poles are identical, except for adaptors 132a, 132b, 133a, 133b for hinge pivots 22a, 22b and extinguishing units 26a, 26b; and consequently it is not deemed necessary to more fully illustrate their construction, the same reference characters being used with the suffix "a" or "b" to indicate the two outer poles. Since the inner ends of the six terminal studs are positioned in a circle as shown by the dotted lines in Fig. 4, the spacing between the studs 23 and 25 for the center pole is greater than the spacing between the studs 23a and 25a, and 23b and 25b, of the outer poles. In order that the three hinged moving contacts 21, 21a and 21b may be identical, since they have to be replaced if badly burned by the arc, adaptors 132, 132a, 132b are used. The adaptor 132 for the center pole extends inwardly to the pivot point 22 whereas the adaptors 132a and 132b extend outwardly to the pivot points 22a and 22b.

All three poles have their operating rods 19, 19a, 19b actuated by the several actuating cranks 16, 16a, 16b (only crank 16 being shown), which are clamped to the same operating shaft 14. Thus, rotation of the operating shaft 14 in a counterclockwise direction, as viewed in Fig. 3, will result in counterclockwise rotative motion of the three actuating cranks 16, 16a, 16b to result in simultaneous opening motion of the three identical hook-shaped movable contacts 21, 21a, 21b. The three arcs, which are established, are quickly extinguished by the extinguishing action exerted within the three arc-extinguishing units 26, 26a, 26b, the latter being, of course, immersed in a suitable arc-extinguishing liquid, such as circuit breaker oil, disposed within the tank 1.

It is to be observed that each actuating crank 16, 16a, 16b, with its associated operating rod 19, 19a, 19b, forms an inverted, or overlapping, toggle 89 in the closed position of the interrupter, in which the crank is in compression and the operating rod is in tension.

Preferably a current transformer 27 is disposed about each of the terminal bushings 3-8, to give a measure of the current passing through each pole of the interrupter, so as to effect proper relay operation should an overload or fault condition exist in the connected circuit.

As shown in Fig. 2, two conduits 28 are provided interconnecting the cover 2 with the mechanism housing 12 so that wires leading to the current transformers 27 may terminate on the panelboard, not shown, disposed within the mechanism housing 12. Also interconnecting the mechanism housing 12 with the tank cover 2 is a conduit 29 serving to enclose the operating shaft 14, the extension 14a being connected with the operating mechanism 13. The outer extremity (Fig. 1) of the operating shaft 14 has clamped thereto an indicator plate 14b reading "open" and "closed," which may be viewed through a glass window provided in the door 30 of the mechanism housing 12. Thus one may determine from a visual inspection of the door 30 of the mechanism housing 12 the condition of the breaker.

Figure 6:
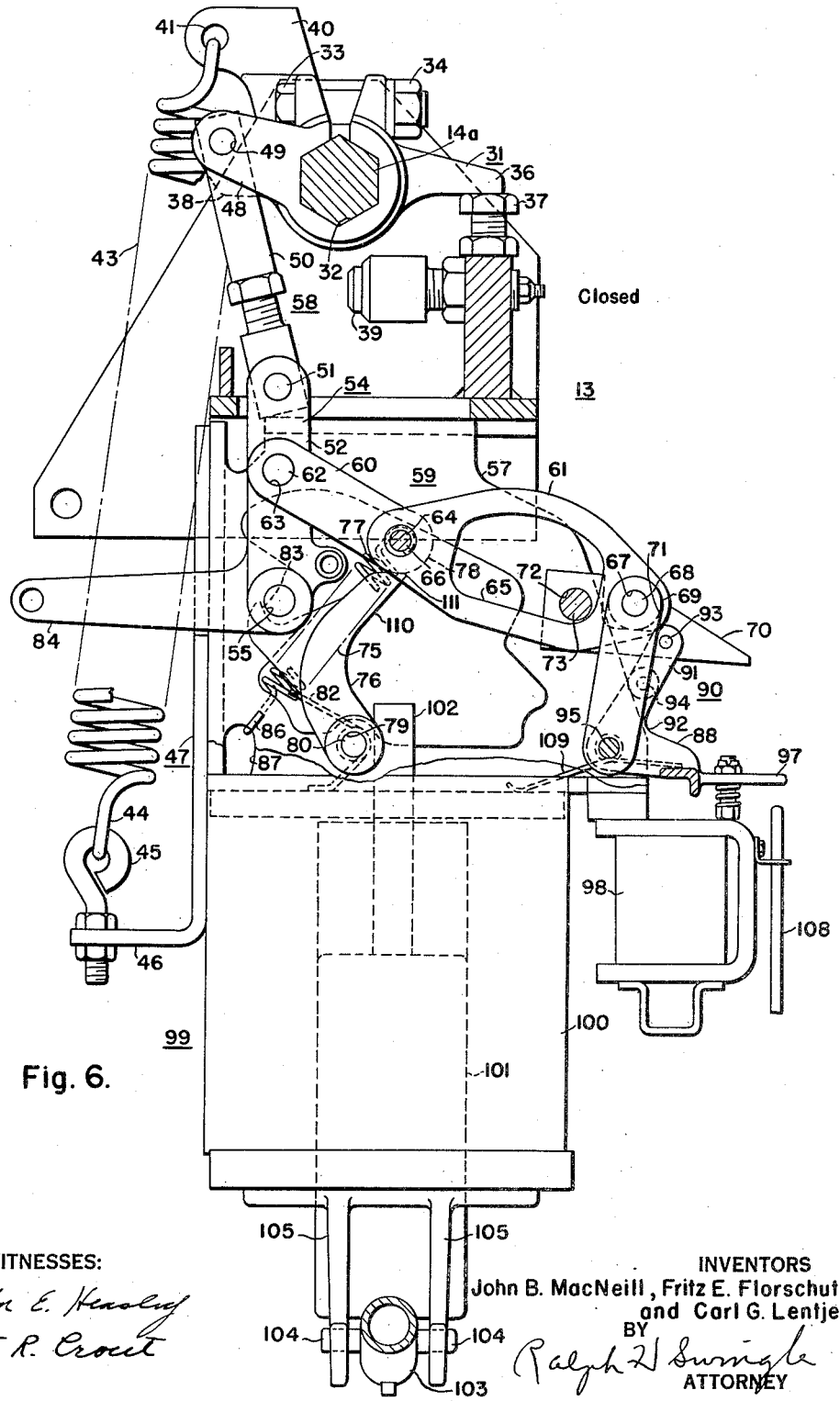
Fig. 6 is a front elevational view of the operating mechanism shown in Fig. 5, with the contact structure being in the closed-circuit position.

Referring particularly to Figs. 5–10 of the drawings, which more clearly show the operating linkage of the operating mechanism 13, it will be observed that secured to an intermediate portion of the operating shaft extension 14a is an actuating clamp 31, more clearly shown in Fig. 6 of the drawings. Referring to Fig. 6 it will be noted that the actuating clamp 31 has a hexagonally-formed clamping portion 32, which is slipped over the hexagonal operating shaft 14. A bolt 33 and a nut 34, serve to provide the desired clamping pressure. Integrally formed with the clamp 31 is a closing-stop portion 36, which strikes an adjustable stop 37 (Fig. 6) at the end of the closing stroke. An opening-stop portion 38 is associated with the clamp 31 to strike an adjustable stop 39 (Fig. 6) at the end of the opening operation. As is conventional, the opening stop 39 preferably has a resilient stop portion, or rubber bumper, to remove the shock of the opening operation.

The actuating clamp 31 also has integrally formed therewith a laterally-extending arm 40 with an aperture 41 provided therein, to which is hooked the upper end of an opening accelerating tension spring 43, more clearly shown in Fig. 6 of the drawings. The lower end 44 of the accelerating tension spring 43 is secured to an eye 45, adjustably clamped to a bracket 46 forming a portion of the frame 47 of the operating mechanism 13.

The actuating clamp 31 also has integrally formed therewith a pair of laterally-extending arms 48 (only one of which shows in Fig. 6) with apertures 49 passing therethrough. Pivotally connected by a pin 49a between the arms 48 is an adjustable toggle link 50, more clearly shown in Fig. 6. The toggle link 50 is pivotally connected, as at 51, to a second toggle link 52, in this instance forming an arm of an actuating lever 54. The actuating lever 54 is rotatably mounted on a fixed pivot 55, provided by a pin extending between two upstanding plate portions 56, 57 (Fig. 5) of the frame 47 of the operating mechanism 13.

From the foregoing, it will be apparent, viewing Fig. 6, that the accelerating tension spring 43 tends to effect collapse of the toggle 58, including the two toggle links 50, 52. During the closing operation, as will become more apparent hereinafter, the toggle 58 is straightened to a slightly underset position, thereby tensioning the spring 43 by the functioning of a second toggle 59 comprising toggle links 60 and 61. The toggle links 60 are pivotally connected by a pivot pin 62 passing through apertures 63 of the actuating lever 54. The other ends of the toggle links 60 are pivotally connected by a movable knee pivot pin 64 to the left hand ends of a pair of second toggle links 61.

As observed in Fig. 6 each of the toggle links 61 has a portion 65 removed therefrom. The toggle knee pivot pin 64 passes through an aperture 66 provided in the toggle link 61. The right hand end of the toggle link 61, as viewed in Fig. 6, has a second aperture 67, which supports a pin 68, the latter supporting a latch roller 69. The latch roller 69 is releasably maintained in position by a tripping latch, or trigger, 70, which has a configuration more clearly shown in Fig. 6 of the drawings. As observed in Fig. 6, tripping latch 70 has a latch portion 71 which accommodates the latch roller 69. Also the tripping latch 70 has an aperture 72 provided therethrough, which supports a pivot pin 73 (Fig. 6), the outer ends of which are supported in apertures 74 (Fig. 5) provided in the vertical plate portions 56, 57 of the frame 47.

The movable knee-joint 64 of the second toggle 59 is biased toward a collapsed position, and to a reset position, by a pair of tension springs 75, more clearly shown in Fig. 6 of the drawings. The knee-joint 64 is maintained in a slightly underset position in the closed position of the interrupter, as viewed in Fig. 6, by a rotatable latch 76. The rotatable latch 76 has a latch portion 77 which latches under a roller 78 (Fig. 6) mounted upon the movable knee pivot pin 64 between the toggle links 60, as shown in Fig. 5. The latch 76 has apertures 79 formed therein through which passes a pin 80, the outer ends of the latter being seated in apertures provided in the side plates 56, 57 of the frame 47. A hairspring 82 encircles the pin 80 and biases the latch 76 in a clockwise direction, as viewed in Fig. 6. The latch 76 moves to a limiting latching position as determined by a stop portion 83 which engages the pivot pin 55, as shown in Fig. 6. The actuating lever 54 has an outwardly-jutting arm 84 which actuates an auxiliary switch, not shown.

The resetting tension springs 75 have their upper ends hooked about the knee pivot pin 64, as shown in Fig. 6, and have their lower ends 86 hooked through apertures 87 provided in the vertically-extending side plates 56, 57 of the frame 47.

A third toggle 90 including toggle links 91, 92 maintain the tripping latch or trigger 70 in its latching position, as shown in Fig. 6. The toggle links 91 are pivotally connected, as at 93, to the tripping latch 70 and have their lower ends pivotally connected to a toggle knee-pin 94 (Fig. 5). The knee pin 94 extends through apertures provided in two arms 92 integrally formed with a bell-crank member 88 stationarily pivoted, as at 95, to a pin, the outer ends of which are supported in apertures 96 (Fig. 5) provided by the upstanding side plates 56, 57 of the frame 47.

The toggle 90 is broken by the counterclockwise movement of the bell-crank member 88, which has a trip-bar portion 97 integrally formed therewith. One or more tripping coils 98 having tripping plungers associated therewith, not shown, may be utilized to effect rotatable movement of the tripping bar 97 and hence opening of the breaker. The tripping coils 98 may be associated with the current transformers 27, 27a, 27b of the three phases, heretofore mentioned in connection with Fig. 3, and one of the tripping coils 98 could be energized by a manually-operated pushbutton in a control circuit.

Figure 8:
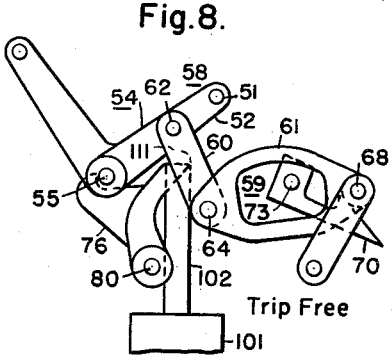
Fig. 8 is a diagrammatic view, similar to that shown in Fig. 7 but indicating the position of the linkage during trip-free operation.

Disposed at the lower end of the frame 47 is a closing magnet 99. The closing magnet 99 includes a closing coil 100, which, when energized, effects upward closing movement of an armature 101 having an upwardly-jutting closing plunger 102 connected thereto. In either the open or the closed positions of the circuit interrupter the armature 101 and the closing plunger 102 remain in their lower at rest position, as shown in Figs. 5 and 6. It is only during a closing operation when the closing coil 100 is energized, that the closing plunger 102 moves upwardly, as indicated in Fig. 8 of the drawings.

To effect manual closing of the breaker, should the closing coil 100 be rendered inoperative by a loss of control power, a manually-operated closing lever 103 is provided, as shown in Figs. 5 and 6. The closing lever 103 has a pair of trunnions 104, which fit into hooked portions 105 extending downwardly from the frame 47. An operator, bearing down on the left-hand end of the closing lever 103, as viewed in Fig. 5, will move a roller 106, at the right-hand end of the closing lever 103, upwardly against the armature 101 to thereby effect upward closing movement of the armature 101 and the closing plunger 102.

To effect a manual release of the breaker from the closed position thereof, and with the operator standing next to the mechanism housing 12, the knob 107 (Fig. 1) may be pulled out. Through a suitable bell-crank arrangement not shown, disposed on the inner wall of the mechanism housing 12, a tripping rod 108 (Figs. 1 and 6) is moved upwardly to effect counterclockwise rotation of the tripping bar 97 in the same manner as would occur should any one of the tripping coils 98 be energized.

As shown in Fig. 6, a hairpin spring 109 is wound about the pivot 95 to bias the bell-crank member 88 and tripping bar 97 in a clockwise direction about pivot 95 to straighten the third toggle 90 and thereby maintain the tripping latch 70 in its latch-set position.

Operation

In the closed-circuit position of the interrupter as shown in Figs. 3 and 6, the electrical circuit passes through the three poles 3—4, 5—6, and 7—8 in an obvious manner, referring to Fig. 3. That is, referring to the middle pole, the circuit passes downwardly through terminal bushing 5 by way of terminal stud 23, through hinge pivot adaptor 132, movable contact 21, stationary contact 24, extinguishing unit adaptor 133 and by way of terminal stud 25 through the terminal bushing 6. When it is desired to open the breaker, one manually pulls the knob 107 (Fig. 1), or electrically energizes a tripping coil 98. As a result of an overload current, or a fault condition existing in the connected circuit, another tripping coil 98, associated with a current transformer 27, may cause the tripping bar 97 to be moved in a counterclockwise direction about its pivot 95 in like manner to open the breaker. Any such action will effect collapse of the latch toggle 90 against the biasing action exerted by hairpin spring 109.

This will move the tripping latch 70 downwardly in a clockwise direction about the pivot pin 73 to enable the latch roller 69 to slip out of the latch portion 71 (Fig. 8), thereby permitting the toggle links 60, 61 to move laterally to the right, as viewed in Fig. 6, so that roller 78 slips off of the latching portion 77 (Fig. 8) of the rotatable latch 76. Because of the biasing action exerted by the tension accelerating spring 43, the toggles 58 and 59 are both in compression. Thus, as soon as the tripping latch 70 moves downwardly, the toggle 59 will rapidly move laterally to the right, as heretofore explained, with the consequent slipping of the roller 78 off of the rotatable latch 76. This will collapse the toggle 59, as shown in Fig. 8, and hence will permit the toggle 58 also to collapse, as a result of the tension spring 43, so that the actuating clamp 31 will effect counterclockwise rotation of the extension 14a of the operating shaft 14.

Figure 9:
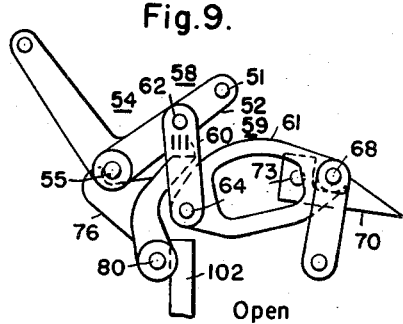
Fig. 9 is a diagrammatic view, similar to those of Figs. 7 and 8, but indicating the position of the mechanism links in the fully open-circuit position; and, Fig. 10 is a diagrammatic view of the toggle mechanism.

As described heretofore in connection with Fig. 3, counterclockwise rotation of operating shaft 14 will effect downward opening movement of all three insulating operating rods 19, 19a and 19b to effect opening of the three contact structures so that the three arcs may be extinguished within the three arc-extinguishing units 26, 26a, 26b. The electrical circuit through the three phases is then broken, and the function of the two tension resetting springs 75 (Fig. 6) is to effect a resetting of the toggle 59, as shown in Fig. 9. Fig. 9 therefore, illustrates diagrammatically the mechanism linkage in the fully open-circuit position of the interrupter.

Figure 7:
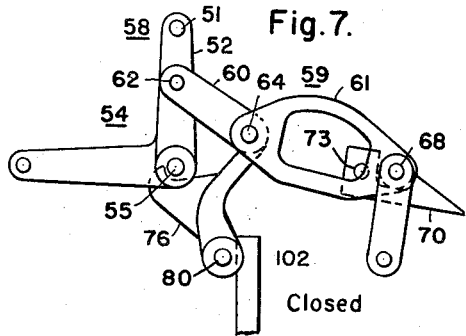
Fig. 7 is a somewhat diagrammatic view of the operating linkage with the contact structure being in the closed-circuit position.

To effect a closing operation of the interrupter, one may energize the closing coil 100, or one may use the closing lever 103, to force the armature 101 and the closing plunger 102 upwardly. Referring to Fig. 9, it will be apparent that upward movement of the closing plunger 102 will force the roller 78 upwardly along the side 110 (Fig. 6) of the rotatable latch 76. When the roller 78 is just over the edge 111 (Fig. 9) of the latch 76, the latch 76 will be forced in a clockwise direction by virtue of the spring 82, to latch under the roller 78. Suitable means then deenergizes the closing coil 100 to thereby cause dropping of the plunger 102 and the armature 101 to their lower position of rest, as indicated in Figs. 5–7.

The forcing of the roller 78 upwardly has resulted in straightening the toggle 59, and hence straightening the toggle 58 against the biasing action exerted by the accelerating spring 43, the tripping latch 70 meanwhile maintaining the roller 69 in its reset position.

The straightening of the toggle 58 results in a clockwise rotation of shaft 14 and hence closing of the three movable contacts 21, 21a, 21b in the manner heretofore described in connection with Fig. 3. The breaker is now in the closed position, the tension spring 43 being in tension and the plunger 102 in its lower position, as indicated in Figs. 5–7.

Should there still be a fault condition existing in any one of the three lines when one attempts to close the interrupter, the operating mechanism 13 functions to trip free. The mechanism 13, consequently, is magnetically tripped free in such circumstances, as indicated in Fig. 8. Referring to Fig. 8, it will be observed that even though the plunger 102 is forced upwardly, either manually by the closing lever 103, or by energization of the closing coil 100, nevertheless, if the tripping latch 70 moves downwardly, as indicated in Fig. 8, the roller 78 will slip off the edge 111 of latch 76 to drop downwardly to its open position, as diagrammatically indicated in Fig. 8. There is no mechanical or electrical way for an operator to force the mechanism to the closed position under such fault-existing conditions.

From the foregoing it will be apparent that we have provided an effective and high-speed circuit interrupter particularly adapted for three-pole operation. As will be obvious, our invention is not confined to a three-pole circuit interrupter, but may be used with a single pole or with a plurality of poles. Using a three-pole circuit interrupter, however, there results a compact and space-saving arrangement, is illustrated in Figs. 3 and 4. The extra space for the current transformers 27 is not provided at the expense of a large tank. Fig. 3 shows the reduction in tank size. The use of the rotatable shaft 14 eliminates any necessity for providing straight-line motion of the insulating rods 19, 19a and 19b. Adjustment of the several actuating cranks 16, 16a, 16b may be readily effected. Moreover the exhaust arc-extinguishing gases emitted from the units 26 will be widely dispersed to prevent flashover, as indicated by the arrows 130 of Fig. 4. The three movable contacts 21, all being identical, assist the user in the stocking of such items.

The operating mechanism is very high speed in action, and by the use of the several toggles mentioned, particularly the toggle 58 and the overlapping toggle 89 between members 16, 19, provides a state of affairs in the closed position, wherein little lateral thrust is exerted on the toggle link 60, the toggle 58 being almost on center. The operating mechanism 13 is compact, composed of few simple parts of rugged construction, and is quickly tripped free in operation.

Although we have shown and described a specific structure, it is to be clearly understood that the same is for the purpose of illustration, and that changes and modifications may readily be made therein without departing from the spirit and scope of the invention.

We claim as our invention:

1. A three-phase, liquid-break circuit interrupter including a round tank having a dome-shaped cover, six terminal bushings extending substantially normally through the dome-shaped cover and having their inner and outer ends substantially equally spaced around two imaginary circles, all the terminal bushings converging radially within the tank so that the imaginary circle embracing the outer ends of the terminal bushings is larger than the imaginary circle within the tank embracing the inner ends of the terminal bushings, the six terminal bushings being divided into three pairs of cooperating terminal bushings, each pair constituting one pole of the circuit interrupter for interrupting one phase of the three-phase circuit, a hinge contact disposed adjacent the interior end of one terminal bushing of each pair of terminal bushings, a swingable movable contact blade rotatably mounted at each hinge contact, one arc-extinguishing unit only per pole and including stationary contact structure, each arc-extinguishing unit being disposed adjacent the interior end of the other terminal bushing of each pair of terminal bushings and being spaced away from its associated hinge contact, and each movable contact blade cooperating with the stationary contact structure of the associated arc-extinguishing unit to establish an arc within the unit.

2. A three-phase, liquid-break circuit interrupter including a round tank having a dome-shaped cover, six terminal bushings extending substantially normally through the dome-shaped cover and having their inner and outer ends substantially equally spaced around two imaginary circles, all the terminal bushings converging radially within the tank so that the imaginary circle embracing the outer ends of the terminal bushings is larger than the imaginary circle within the tank embracing the inner ends of the terminal bushings, the six terminal bushings being divided into three pairs of cooperating terminal bushings, each pair constituting one pole of the circuit interrupter for interrupting one phase of the three-phase circuit, a hinge contact disposed adjacent the interior end of one terminal bushing of each pair of terminal bushings and the hinge contact for the center pole being at the opposite side of the circuit interrupter from the hinge contacts for the other two poles, a swingable movable contact blade rotatably mounted at each hinge contact, a single arc-extinguishing unit per pole each including stationary contact structure and being disposed adjacent the interior end of the other terminal bushing of each pair of terminal bushings and spaced away from its associated hinge contact, each movable contact blade cooperating with the stationary contact structure of the associated arc-extinguishing unit to establish an arc within the unit, and the three arc-extinguishing units being staggered in triangular configuration within the tank to reduce the possibility of comingling of the hot arc gases exhausted from the arc-extinguishing units and thereby preventing flashover between poles.

3. A three-phase, liquid-break circuit interrupter including a round tank having a dome-shaped cover, six terminal bushings extending substantially normally through the dome-shaped cover and having their inner and outer ends substantially equally spaced around two imaginary circles, said dome-shaped cover having a substantial depth and a larger external diameter than the external diameter of the round tank to provide a space for one or more current transformers within the dome of the cover, one or more current transformers in said space each surrounding one of the terminal bushings, all the terminal bushings converging radially within the tank so that the imaginary circle embracing the outer ends of the terminal bushings is larger than the imaginary circle within the tank embracing the inner ends of the terminal bushings, the six terminal bushings being divided into three pairs of cooperating terminal bushings, each pair constituting one pole of the circuit interrupter for interrupting one phase of the three phase circuit, a hinge contact disposed adjacent the interior end of one terminal bushing of each pair of terminal bushings, a swingable movable contact blade rotatably mounted at each hinge contact, one arc-extinguishing unit only per pole and including stationary contact structure disposed adjacent the interior end of the other terminal bushing of each pair of terminal bushings and spaced away from its associated hinge contact, and each swingable movable contact blade cooperating with the stationary contact structure of the associated arc-extinguishing unit to establish only one arc per pole within the unit.

4. A three-phase, liquid-break circuit interrupter including a round tank having a dome-shaped cover, six terminal bushings extending substantially normally through the dome-shaped cover and having their inner and outer ends substantially equally spaced around two imaginary circles, all the terminal bushings converging radially within the tank so that the imaginary circle embracing the outer ends of the terminal bushings is larger than the imaginary circle within the tank embracing the inner ends of the terminal bushings, the six terminal bushings being divided into three pairs of cooperating terminal bushings, each pair constituting one pole of the circuit interrupter for interrupting one phase of the three-phase circuit, a hinge contact disposed adjacent the interior end of one terminal bushing of each pair of terminal bushings, a swingable movable contact blade rotatably mounted at each hinge contact, an arc-extinguishing unit including stationary contact structure disposed adjacent the interior end of the other terminal bushing of each pair of terminal bushings and spaced away from its associated hinge contact, each movable contact blade cooperating with the stationary contact structure of the associated arc-extinguishing unit to establish an arc within the unit, a rotatable operating shaft extending laterally within the round tank, and three insulating operating rods each connecting one movable contact blade with the rotatable operating shaft.

5. A three-phase, liquid-break circuit interrupter including a round tank having a dome-shaped cover, six terminal bushings extending substantially normally through the dome-shaped cover and having their inner and outer ends substantially equally spaced around two imaginary circles, all the terminal bushings converging radially within the tank so that the imaginary circle embracing the outer ends of the terminal bushings is larger than the imaginary circle within the tank embracing the inner ends of the terminal bushings, the six terminal bushings being divided into three pairs of cooperating terminal bushings, each pair constituting one pole of the circuit interrupter for interrupting one phase of the three-phase circuit, a hinge contact disposed adjacent the interior end of one terminal bushing of each pair of terminal bushings and the hinge contact for the center pole being at the opposite side of the circuit interrupter from the hinge contacts for the other two poles, a swingable movable contact blade rotatably mounted at each hinge contact, one arc-extinguishing unit only per pole and including stationary contact structure disposed adjacent the interior end of the other terminal bushing of each pair of terminal bushings and spaced away from its associated hinge contact, each movable contact blade cooperating with the stationary contact structure of the associated arc-extinguishing unit to establish only one arc per pole within the unit, the units being staggered in triangular configuration within the tank to lessen the danger of flashover between poles, a rotatable operating shaft within the round tank, and three insulating operating rods each connecting one movable contact blade with the rotatable operating shaft.

6. A circuit interrupter of the fluid blast type including a round tank containing an arc-extinguishing fluid, at least two pairs of terminal bushings extending convergingly into the round tank, a stationary contact structure associated with the interior end of one terminal bushing of each pair of terminal bushings, a hinge pivot adaptor associated with the interior end of the other terminal bushing of each pair of terminal bushings, and a pair of identical pivoted contact members pivotally mounted on the hinge pivot adaptors and engaging the two stationary contact structures in the closed circuit position of the interrupter.

7. A circuit interrupter of the fluid blast type including a round tank containing an arc-extinguishing fluid, at least two pairs of terminal bushings extending convergingly into the round tank, a stationary contact structure associated with the interior end of one terminal bushing of each pair of terminal bushings, a hinge pivot adaptor associated with the interior end of the other terminal bushing of each pair of terminal bushings, a pair of identical pivoted contact members pivotally mounted on the hinge pivot adaptors and engaging the two stationary contact structures in the closed circuit position of the interrupter, and the hinge pivot adaptors being disposed in staggered position.

8. A circuit interrupter of the fluid blast type including a round tank containing an arc-extinguishing fluid with a dome-shaped cover, at least two pairs of terminal bushings extending into the round tank normally of the dome-shaped cover, a stationary arc extinguishing unit associated with the interior end of one terminal bushing of each pair of terminal bushings, a hinge pivot adaptor associated with the interior end of the other terminal bushing of each pair of terminal bushings, and a pair of identical pivoted contact members pivotally mounted on the hinge pivot adaptors.

9. A circuit interrupter of the fluid blast type including a round tank containing an arc-extinguishing fluid with a dome-shaped cover, at least two pairs of terminal bushings extending into the round tank normally of the cover, a stationary arc extinguishing unit associated with the interior end of one terminal bushing of each pair of terminal bushings, a hinge pivot adaptor associated with the interior end of the other terminal bushing of each pair of terminal bushings, a pair of identical pivoted contact members pivotally mounted on the hinge pivot adaptors, and the hinge pivot adaptors being disposed in staggered position.

10. A multipole liquid-break circuit interrupter including a round tank filled with an arc-extinguishing liquid, three pairs of terminal bushings extending convergingly radially into the round tank, three extinguishing units immersed in the liquid, three extinguishing unit adaptors secured to the interior ends of one of each pair of terminal bushings for supporting the units in position, three hinge pivot adaptors secured to the other of each pair of terminal bushings, and three identical movable contact members pivotally mounted on the hinge pivot adaptors.

11. A multipole liquid-break circuit interrupter including a round tank filled with an arc-extinguishing liquid with a dome-shaped cover, three pairs of terminal bushings extending into the round tank normally of the dome-shaped cover, three extinguishing units immersed in the liquid, three extinguishing unit adaptors secured to the interior ends of one of each pair of terminal bushings for supporting the units in position, three hinge pivot adaptors secured to the other of each pair of terminal bushings, three identical movable contact members pivotally mounted on the hinge pivot adaptors, and the hinge pivot adaptors being disposed in staggered relation.

References Cited in the file of this patent

UNITED STATES PATENTS

| | | |
|---|---|---|
| 1,740,558 | Ainsworth | Dec. 24, 1929 |
| 1,761,724 | Hamlyn et al. | June 3, 1930 |
| 2,012,409 | Starr | Aug. 27, 1935 |
| 2,252,983 | Rossman | Aug. 19, 1941 |

FOREIGN PATENTS

| | | |
|---|---|---|
| 510,473 | Great Britain | Aug. 2, 1939 |
| 522,369 | Great Britain | June 17, 1940 |
| 611,388 | Great Britain | Oct. 28, 1948 |
| 648,635 | Germany | Aug. 6, 1937 |